United States Patent [19]

Homanick

[11] 4,056,066
[45] Nov. 1, 1977

[54] DISPLACEABLE CEILING MOUNTED CARGO RESTRAINT SYSTEM

[75] Inventor: George Homanick, Lathrup Village, Mich.

[73] Assignee: PepsiCo Inc., Purchase, N.Y.

[21] Appl. No.: 667,155

[22] Filed: Mar. 15, 1976

[51] Int. Cl.² ............................................. B61D 45/00
[52] U.S. Cl. .................................. 105/493; 105/468; 105/496; 206/522
[58] Field of Search ................... 105/366 R, 463, 465, 105/467, 468, 491, 495, 496; 206/522; 214/10.5 D; 280/179 R, 179 A, 179 B

[56] References Cited

U.S. PATENT DOCUMENTS

| | | | |
|---|---|---|---|
| 2,907,580 | 10/1959 | Tietig | 105/468 X |
| 3,098,455 | 7/1963 | McElroy et al. | 105/491 |
| 3,612,316 | 10/1971 | Baldwin et al. | 214/516 |
| 3,733,005 | 5/1973 | Frieder, Jr. | 105/468 X |
| 3,749,268 | 7/1973 | Macomber et al. | 214/516 |
| 3,847,091 | 11/1974 | Holt | 105/468 |

FOREIGN PATENT DOCUMENTS

| | | | |
|---|---|---|---|
| 613,000 | 3/1958 | Canada | 105/468 |

*Primary Examiner*—Robert J. Spar
*Assistant Examiner*—Carl Rowold
*Attorney, Agent, or Firm*—Scully, Scott, Murphy & Presser

[57] ABSTRACT

A cargo restraint system comprising pneumatic engagement means especially adapted for tall upright wheeled carriers for e.g. beverages.

14 Claims, 4 Drawing Figures

DISPLACEABLE CEILING MOUNTED CARGO RESTRAINT SYSTEM

FIELD OF THE INVENTION

This invention relates to the transportation of cargo, and methods and apparatus for the control, and provision of a stable attitude or position of goods or containers therefor. More particularly, it relates to the stabilization of goods in transit in an upright position by means of displaceable restraint members releasably engageable with the uppermost portion of goods or containers of standardized dimension.

Goods of all kinds are routinely shipped by vessels or vehicles including trains, boats or trucks over terrain or under conditions such that displacement or tipping is likely to occur. This is particularly undesirable in the case of breakable goods especially where the goods themselves are generally unsupported against tipping, as in carriers for bulk transit, or so called containerized shipping.

The case is typified by the carriage of bottled beverages in standard bulk carriers for delivery to retail outlets. In such an operation, the bottled beverages, supported only in the familiar shallow compartmentalized boxes for example, are place in a standard bulk carrier, comprising an upright wheeled unit for ready removal from the vehicle. These units obviously are dimensioned for passage through doorways and accordingly tend to be taller than they are wide with the expected instability. Whenever less than a full load is involved, the carriers are also susceptible to sliding or rolling action within the truck and even a full load permits tipping of the racked goods with consequent breakage. This undesirable characteristic if of course exacerbated where the goods themselves are inherently tippable, as in the case of bottles.

DISCUSSION OF THE PRIOR ART

Cargo restraint systems constituting braking devices for the base of goods or containers therefor are known as, for example, may be seen in U.S. Pat. Nos. 2,710,105; 3,204,797; 3,559,831; or 3,874,538. Base related inflatable devices have also been used for selective engagement of a drive chain with pallets in U.S. Pat. No. 3,612,316. However, base connected cargo restraint systems are entirely ineffective with tall, inherently tippable cargo, such as standard bulk carriers for beverages, weighing some 1400 lbs. loaded and ranging to 72 inches in height, especially where the braking mechanism is engageable only with a slave pallet beneath the cargo proper.

SUMMARY OF THE INVENTION

A method and apparatus for the handling of cargo has now been developed, in which tippable goods of standardized dimension are stabilized in an upright configuration in transit by the imposition of restraint means in releasable resilient engagement with the upper portion thereof. The system is capable of being infinitely cycled into and out of engagement with the goods in sequence conformed in operation to delivery stops, or ultimate destination.

In accordance with a preferred embodiment of the invention, an enclosed truck body is fitted with a sub-roofing i.e. a planar, horizontally disposed sheet of wood or metal, mechanically fastened to the roof (or support structure therefor) through pneumatic means by which it is movable in a unitary manner toward and away from the roof in planes parallel thereto. In operation, the system is actuated for transit whereupon the sub-roofing is vertically displaced away from the truck roof into resilient pressure engagement with the upper part of the goods or containers being transported.

In the case of flat topped containers, for example, the sub-roofing directly engages at least a substantial portion of the container top in mating facial relation (where the goods or containers have a contoured or configured top, only a portion may be in contact with the roof or, where desired, bumpers or pads may be interposed to provide the necessary gripping action).

The pneumatic system may be of any conventional type, but a convenient and simple arrangement employs a collection of inflatable air bags, suitably constituted in one embodiment by tubular structures like fire hose. These air bags are ordinarily engaged to the roof or support structure therefor and to the sub-roofing and are dimensioned such that upon full inflation the sub-roofing is placed directly into pressurized engagement with the tops of the goods or containers. The surface for engagement with the goods or containers will preferably be characterized by a certain roughness sufficient to minimize any tendency to sliding thereacross.

Where desired, the system may be subdivided as into segments, e.g. quarters of the truck, such that only a portion of the cargo may be disengaged at for example a given retail outlet for delivery. Most desirably, however, the system of this invention is employed in combination with means for circulatively interpositioning carriers for goods within a truck (as discussed hereinafter) requiring full movement of all carriers at each delivery location.

The present invention is thus understood to comprise a cargo restraint system incorporating one or more restraint members adapted to resiliently contact the uppermost portion of the cargo directly, or in the case of carriers therefor, indirectly. The restraint arrangement is in a locked configuration at all times during transit, and is entirely self-contained to the trailer or van, such that disengagement from the cab or other motive carriers does not affect the contraint applied to the cargo.

In accordance with one aspect of this invention, the cargo restraint system suitably comprises a multiplicity of restraint members conformed in dimension to engage individual goods or containers in pairs at opposed locations. Thus, in the case of a generally rectangular carrier structure, the restraint members will contact the top of the carrier at opposed sides, commonly exteriorly and interiorly relative to the center line of the truck bed. It is usually found convenient in the case of standardized cargo for members of the restraint system to be composed of a plurality of contact members aligned in the same horizontal and vertical planes with subdivisions conforming to the cargo dimensions. For example, in the case of a collection of standardized beverage carriers positioned commonly in matched rows (the axes of the opposed carriers on each side fall in common planes) from front to back along a longitudinal truck bed, the contact members will desirably comprise two pairs of running subdivided restraint members, in each case comprising a plurality of first restraint elements adjacent a side wall, and a plurality of second restraint elements adjacent the center of the truck bed, each interior/exterior pair of restraint members arranged to contact the interior and exterior topmost portion of an individual carrier. A mirror image comprising a separate pair of contact members engages the containers, or carriers on the opposite side of the truck.

The pneumatic system for such an arrangement need not be similarly subdivided, as it will conform to the vertical extension of each of the contact members automatically. Accordingly, in the case of the preferred air bag arrangement, a single air hose will support an entire linear chain of restraint members.

This approach to construction detail is especially well adapted to operations wherein the truck is not fully loaded: a given restraint member will simply assume a fully extended position without engagement whereas others will engage carriers or goods; or for carriers (as in the case of beverages) mounted on a slight tilt, where the inner and outer pairs of contact members engage at slightly different elevations.

Since in a common geometrical arrangement for optimum packing and weight distribution, single carriers may be disposed in a position central of the truck bed on opposed ends of the truck (front and back) separate unitary restraint members for such carriers are conveniently utilized, pneumatically controlled in the preferred embodiment by air hose about the periphery thereof.

The most preferred embodiment of the present invention comprises a combination with a cargo cycling system wherein goods or carriers are translocated within the truck along a flattened oval path leading along the rectangularly disposed exterior walls. Thus, carriers for bottled beverages may be positioned on slave pallets permanently linked to a motivating mechanism such as a chain drive located along the center longitudinal axis of the truck, for controlled access in sequence of the carriers to a side or rear exit. A suitable such system is disclosed and claimed in copending and commonly assigned Appln. Ser. No. 667,156 of the same inventive entity filed concurrently herewith and incorporated by reference.

The pneumatic system may be of any suitable design, and need not provide high speed responsiveness as it may be and preferably is, engaged slowly to permit any minor load adjustments prior to locking in the system. The equipment will of course be valved to maintain the pneumatic pressure without significant bleed once locked into an engaged position.

As it is entirely possible for there to be a differential attitude relative to the horizontal on loading and unloading, there may be a tendency for the goods to tip upon release of the pneumatic forces. Accordingly, it is also desired to release the pressure controllably, and at a rate adapted to permit the goods or containers to settle gravitationally into a new stable setting.

Although the optimum applied pressure might vary as between goods of various weights for example, practical considerations will ordinarily dictate the use of a standard applied pressure, which for regularized containers will likely be conformed to the maximum loading and the lowest applicable temperatures. Preferably the applied pressure should be such as to control tipping or sliding of engaged materials in a fully loaded truck to a 6% grade. Ordinarily, the pressure will range from 35 to 50 psig, for a 1200–1500 lb. payload.

To aid in return of the engagement mechanism to a depressed condition, the contact members are usually evenly spring loaded at a plurality of points. The action of the spring return members also aids in flushing the pneumatic system such that after careful disengagement by reduction in pneumatic pressure the system may be readily and quickly fully disengaged and displaced into a depressed condition to permit easier handling of the goods transported. Quick release valves may of course be used to advantage in the system.

The air bag construction, where employed as the pneumatic means, will of course be impermeable to the passage of air under the applied pressure and be formed of material reasonably resistant to extreme temperatures, thermal cycling, petroleum fumes as well as hydrocarbon combustion residues. The surface should be resistant to abrasion or puncture. A cotton/polyester fabric construction over rubber has worked satisfactorily.

While the air bag form of constraining device has been found convenient, especially for replacement at reasonable expense, the pneumatic means may also constitute cylinder-plunger mechanisms of the usual type at spaced and balanced locations along the interior of the contact members.

In certain cases it may be desirable to provide the restraint members, on sub-roofing with a resilient contact face such as a deformable foam surface. Upon engagement with the uppermost portion of the goods or containers, the foam will provide good fixed contact and also tend to grip around and about the goods or containers to provide further security against sidewide slippage i.e. the foam portions between containers will remain uncompressed by engagement, cushioning the goods or containers in place.

Reference to a sub-roofing herein as constituting an essential element of a cargo restraining mechanism is, of course, without limitation; the invention is hence inclusive of an embodiment where the pneumatic means when of suitable construction, such as an air bag, itself forms the surface for direct engagement with the goods or containers therefor in whole or in part, especially where the goods or containers to be so engaged are of regularly contoured configuration free of sharp edges or points and the like.

The preferred system for constraint of beverage containers is based upon a standard bulk carrier in wide usage comprising an open mesh rectangular (27 × 42 inches) metallic structure 72 inches tall, mounted upon casters and weighing when loaded about 1400 lbs. These carriers are arranged within a 96 inch truck bed sideways, and are carried on slave pallets, ordinarily at a 3° tilt downwardly toward the center of the truck.

These carriers are especially adapted for delivery to retail outlets of reasonably small orders, and pickup of returnables. Accordingly, at each stop one or sometimes more of the fully loaded carriers are to be removed from the truck and like-sized carriers with returnable replaced within the truck. Since the side or rear exit is of fixed location, the loaded carriers must be circulated within the truck to accomplish the desired presentment per stop.

Since the carriers are wheeled or otherwise moveable, this may be accomplished by manual manipulation. However, the weight in question is prohibitive, hence mechanical devices are commonly employed for circulative deployment of the carriers within the truck.

Although such devices can take many forms (such as those disclosed in U.S. Pat. Nos. 3,204,797; 3,559,831; 3,724,698; 3,749,268, 3,831,794 or 3,877,596), the most preferred for optimization of space, minimization of mechanistics and ready adaptation to existing carriers is that of copending application Ser. No. 667,156 aforementioned.

In accordance with this principle, slave pallets permanently affixed to a motivating chain drive are ordered in sequence around the periphery of the truck, and the pallets are indexed automatically with the exterior opening at a delivery stop. The carriers are rolled directly to and from the truck and upon the slave pallet as there is no physical interconnection therewith once the cargo restraint system is in a released or unlocked condition.

During the loading and unloading of cargo at a given location, the restraint system is rendered inoperative i.e. it assumes a withdrawn or disengaged posture relative to the cargo. The circulative mechanism is of course intermittently engaged to displace goods carriers away from the opening in the truck wall and toward the interior along the predetermined path. Typically, the slave pallets, for example, are arranged to follow a generally rectangular path with the pallets turning 90° about a small radius in the corners of the rectangular superstructure, always presenting the same dimension to the exterior.

For convenience of operation, the mechanism is so arranged that movement along the pallet path is interrupted automatically upon the presentment of the next carrier to the truck opening. This indexing action is repetitive when selected unless overridden by manual control and automatically programs the next delivery.

Where, as occasionally occurs, a delivery is missed or delivery sequence must be rearranged, a further feature of the system becomes valuable. The chain drive mechanism and interengaged pallet is reversibly mobile, and the automatic index feature programmed to minimize cycling time (optimally, 7 seconds per pallet, or 3 minutes for the full load), hence a missed or recalled pallet and associated carrier is returned to the available position by the shortest path i.e. by circularization in either direction.

To insure regularized loading, it will of course be necessary to sequence the arrangement of loaded, partially loaded or unloaded carriers in a manner expected in the art, but a further interlocking system feature is employed to minimize misloading. The most stable position for the slave pallets and associated carriers in the engaged position of the cargo restraint system provides lined up and matched pallets along the length of the truck, and one at the forward end, centrally located. The next sequential translocation of the pallets will emplace them into the corners of the truck, which for most efficient operation is avoided.

Accordingly, an interlocking arrangement has been interposed such that it is physically engaged by a portion of the pallet structure at all times the pallet is within any portion of the corner region. Thus, the system when in automatic operation will advance the pallets to the next position of preferred stable alignment, and/or prevent the engagement of the restraint system.

As the loading or unloading operation is completed and transit commenced, the cargo restraint system is lockingly engaged. The air bags, for example, are inflated to expand the flaccid structure into resilient engagement with the tops of the carriers. Most desirably, the pallets are disposed as referred to above in a regularized configuration such that the paired restraint members individually engage a carrier. Thus, for example, the air bags may displace a pair of stiff planar members approximately 12 inches in width each against interiorly and exteriorly defined portions of the generally horizontal top of carriers of bottled beverages under a pressure of about 40 psig to fully stabilize such carriers against lateral movement in transit. The planar members, commonly plywood board, are controlled by common pneumatic means but are subdivided along their length to individually match the dimensions of the individual carrier in the indexed stable condition.

The stability of bottled beverages may be furthered in such operations by tilting the carrier beds inwardly, i.e., canting the floor provided by the pallet toward the truck center. This obviously aids in reducing the tendency to outward mobility of the carriers and may be effected at these weights with only a 3° to 5° tilt. However, even such a small height differential interior to exterior for a carrier with a horizontal top can impact upon an undifferentiable cargo restraint system, leading to imbalances and resultant loss. The present system overcomes any mismatch by affording independent pneumatic extension of restraint members at opposed interior and exterior segments of the carrier, automatically compensating for the angle from the horizontal or other system variations.

The system is entirely self-contained as the entire pneumatic system is located within the van or trailer, separately powered by, for example a rechargeable 24 volt DC battery.

The truck itself, although limited by I.C.C. regulation to a 96 inch width, may be of several configurations ranging from a van to a full trailer. Thus, capacity for standard bulk carriers, for example may range from 19 to 33 or more. The truck floor or associated elevation means permits dock height or ground level loading and unloading.

Although the foregoing description has dealt with horizontally disposed contact members vertically displaced into engagement with the cargo, it is understood that at least the portions adjacent the edges of the cargo e.g. along the side walls may be slanted into planes canted toward the ground, or even vertically oriented. In other words the constraining force or part thereof in the latter instance could be applied in a manner urging the goods or carts toward the center of the vehicle. For example, the constraint mechanism may comprise pairs of contact members pneumatically urged to about a 45° angle to the horizontal toward the upper corners of the goods adjacent the side walls and truck center. Thus, a pair of simple inverse 'L' shaped corner braces pneumatically engaged with the goods may suffice.

For ease of description the present invention has been principally described relative to a truck for beverage delivery utilizing standard bulk carriers, however, it is understood that the cargo restraint system described has applicability generally to cargo handling in vessels of lading of all types, including trains, aircraft, merchant ships and the like; cargo of all kind and nature, including mail and comestibles; and delivery and pickup operations generally, as for franchise systems, etc.

BRIEF DESCRIPTION OF THE DRAWINGS

Reference may now be had to the following detailed description of a preferred embodiment invention, taken in conjunction with the accompanying drawings; in which.

DETAILED DESCRIPTION

Figure 1:
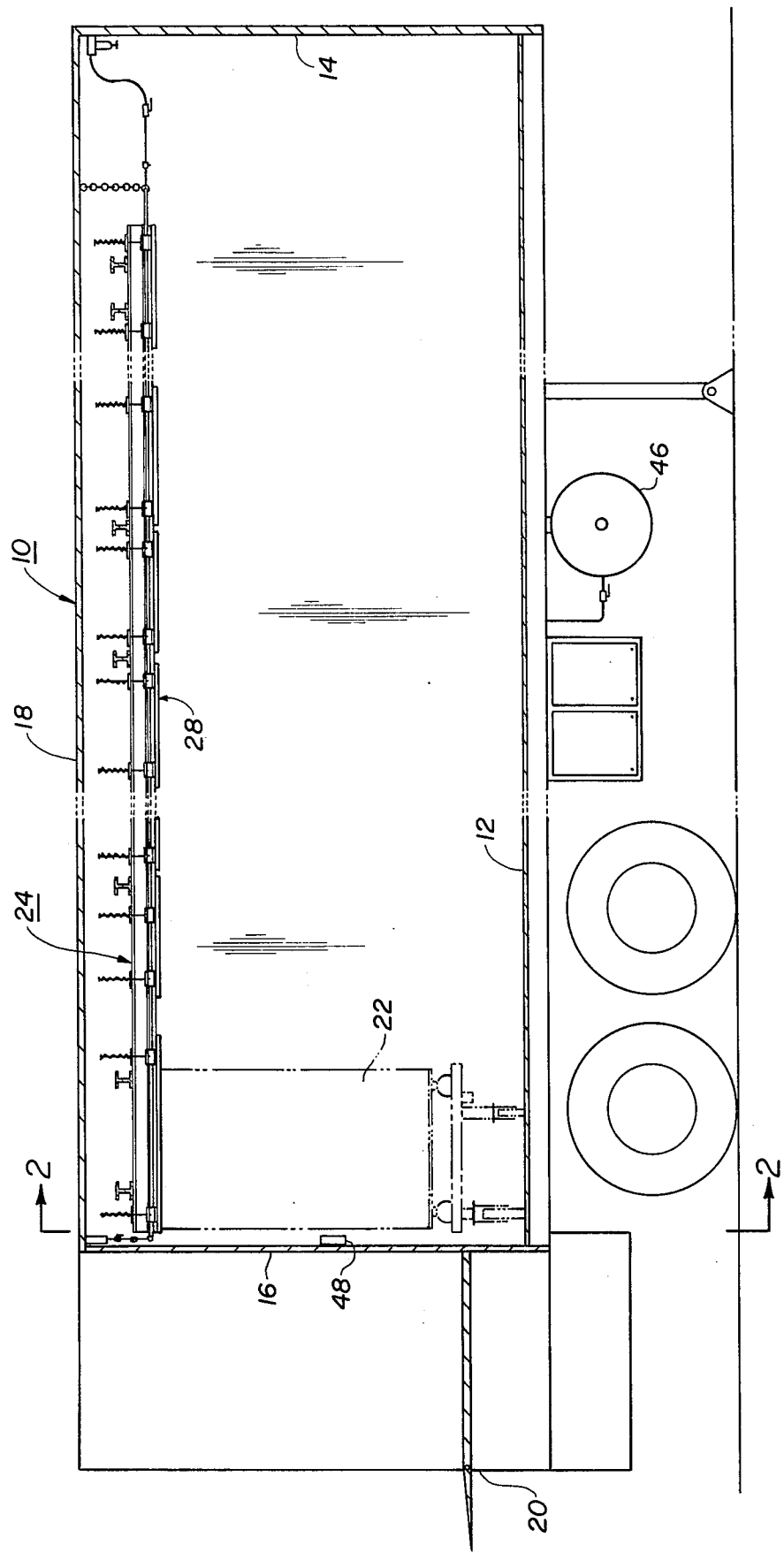
FIG. 1 shows a side elevational viewing section of a truck body incorporating a cargo restraining arrangement pursuant to the invention.

Referring now in detail to the drawings, FIG. 1 illustrates a truck body 10 having an enclosed cargo storing area formed primarily by the floor or cargo supporting platform 12, upright supports and walls 14 and 16, and roof structure 18. The truck body 10 also includes a platform lifting arrangement 20 for hoisting cargo carried on bulk carrier carts from street level to that of the floor 12 for either loading or unloading. The truck body 10 may contain a suitable load conveying arrangement as disclosed, for example, in copending application Ser. No. 667,156.

Figure 2:
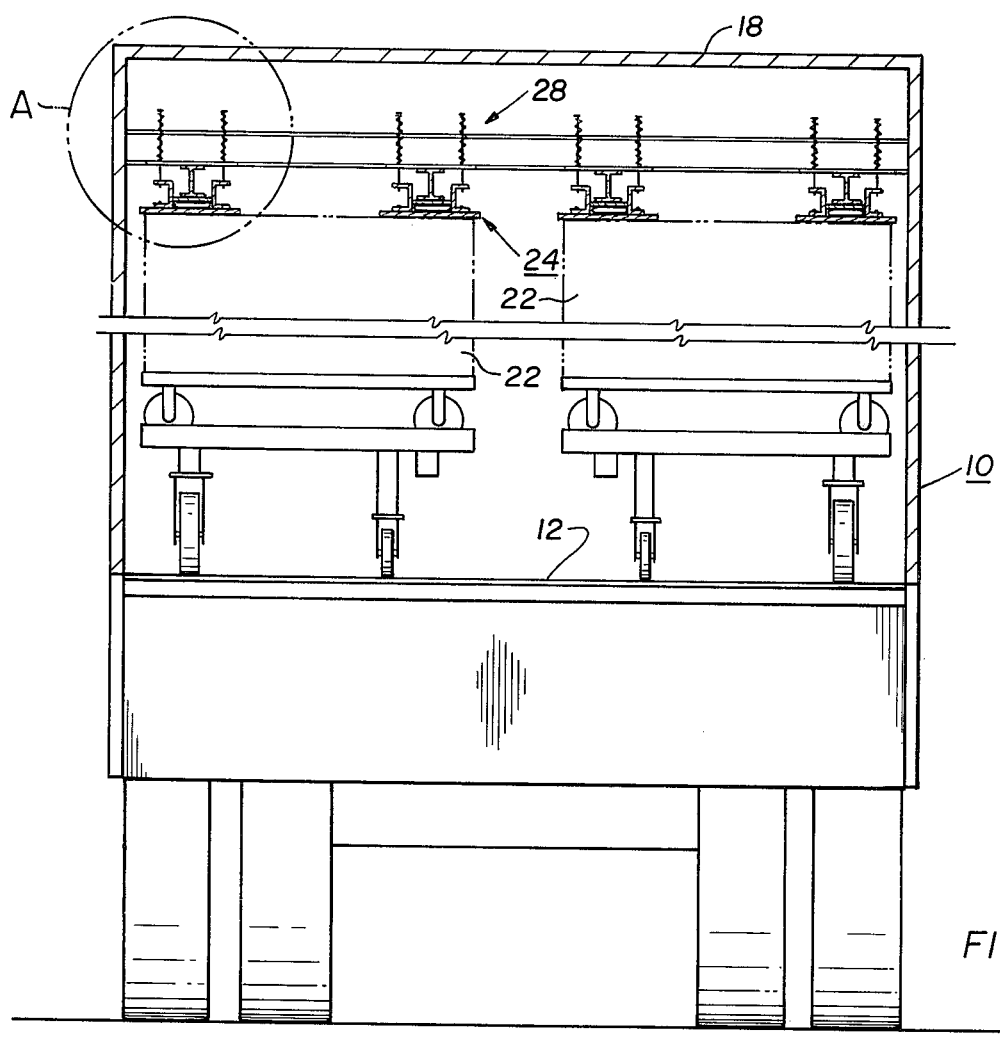
FIG. 2 is a section taken along a line 2—2 in FIG. 1.
Figures 3, 4:
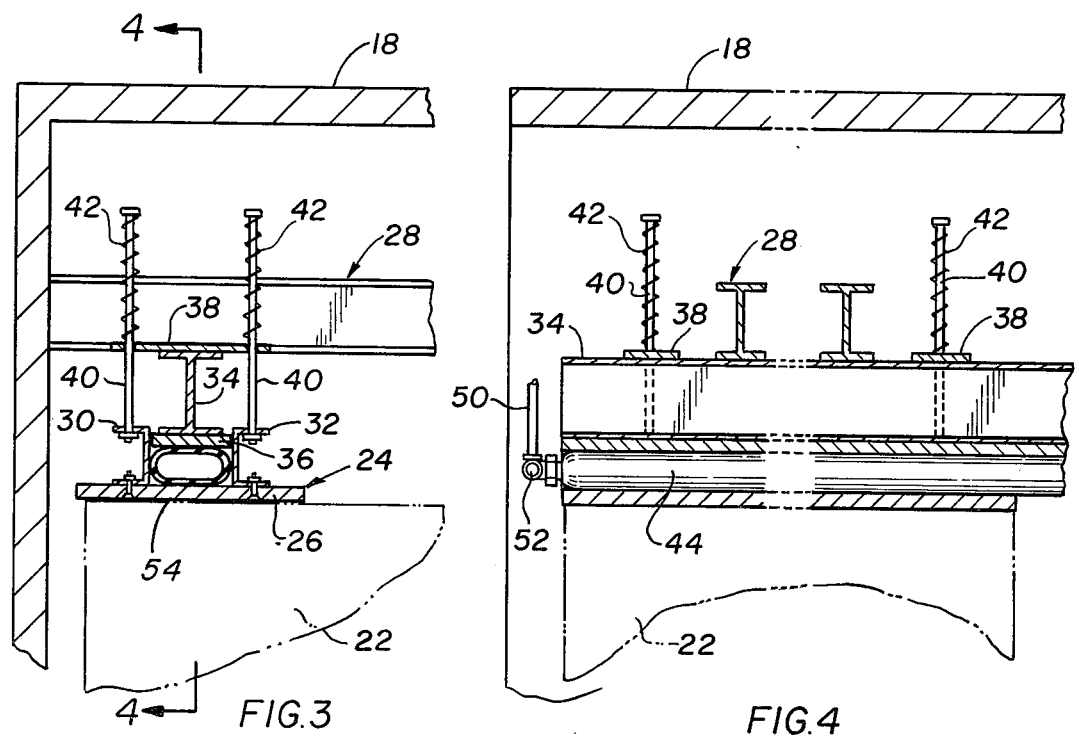
FIG. 3 is an enlarged sectional view of the circled portion A in FIG. 2.
FIG. 4 is a sectional view taken along line 4—4 in FIG. 3.

In order to prevent the cargo carriers or carts 22 which are stored in the truck body 10 from tilting or tipping during conveyance of the latter, the present invention provides for a cargo restraining arrangement 24. As shown in enlarged and amplified detail in FIGS. 3 and 4 of the drawings, the cargo restraining arrangement 24 consists of a plurality of horizontally extending planar board members 26 which are spaced in essentially four parallel rows, along the length of the truck body 10 as shown in FIG. 2, so as to thereby form a sub-roofing structure 28.

Since the load carrying carts 22 are generally arranged in two parallel rows, in order to provide for optimum restraint against tipping during transportation of the truck body, one row of each of the planar boards 26 extends along the interior side and another row along the exterior side of each cart 22. Each of the board members 26, which may be constituted of plywood or the like, is fastened to paired U-shaped brackets 30 and 32 having a space provided therebetween. Located between the brackets 30 and 32 is a horizontally extending I-beam 34 which has the bottom thereof fastened to a plate 36 and the upper end to a fixed horizontal plate 38, the latter of which is stationary relative to the roof structure 18.

Vertical rod members 40 extend through apertures formed in plate 38 and are fastened at the lower ends thereof to the brackets 30 and 32. The rod members at their upper ends connect to compression return springs 42. Located in the space formed between plate 36, board 26 and brackets 30 and 32 is an expandable or inflatable air bag member 44, of which one continuous member may be provided so as to extend along the full length of the truck body 10 for each of the rows of the plate members 26. Alternatively, it is also possible to provide a separate air bag member 44 above each plate member 26.

The air bag member is preferably formed of an air-impervious rubber which is sheathed in an encompassing cotton-polyester fabric to thereby improve its wearability properties.

Air pressure accumulator 26 is mounted below the truck body 10 and communicates, through the intermediary of a suitable manually operable control 48 mounted on the truck body, with an air inlet conduit 50 and manifold 52 leading into the air bag member 44.

In the absence of pressurized air being supplied to the inflatable air bag member 44, the compressive force of springs 42 will tend to pull the brackets 30 and 32, and resultingly the planar board member 26 upwards towards the roof structure 18 so as to flatten or collapse air bag member 44 against the plate 36. However, subsequent to the loaded carts 22 being positioned in the truck body, and it being desired to effect restraint thereof against tipping or tilting during transportation, pressurized air is supplied from the pressure accumulator 46, responsive to actuation of manual control 48, into the conduit 50 and the manifold 52. This will cause the air bag member 44 connected thereto to inflate. Since the plate 36 is stationary, and the space between brackets 30 and 32 is limited, the resultant expansion of the air bag member 44 will exert a downward thrust against the plate member 26 in opposition to the upward pull of return springs 42. This will cause the lower surface of the plate member 26 to restrainingly engage the upper end of the particular cart 22 with which it is in vertical alignment. Preferably, the manual control 48 will cause pressurized air to simultaneously flow into all of the air bag members of the various rows in the truck body so as to exert a simultaneous and uniform downward restraining or clamping pressure against all of the load carrying carts 22 which are being transported in the truck body. The utilization of resilient and thus somewhat sideways deflatable elastic springs 42 will permit the plate member 26 to tilt or incline to some extent in conformance with the slope or incline of each of the carts when the latter are stored in the truck body 10.

In a further feature of the invention, a foamed material padding or cover 54 may be fastened to the lower surface of each of the plate members 26 so as to provide a form-fitting engagement with the upper end of load or cargo supporting cart 22 with which the plate member 26 is in vertical alignment. This will enhance the gripping and restraining interengagement between the plate member 26 and the associated cargo or cargo carrying cart 22.

When it is desired to effectuate movement of the carts 22 within the truck body, either for the purpose of loading, unloading, or shifting the cargo, through respective actuation of manual control 48 the pressurized air may be either vented from the air bag members 44, thereby causing the air bag members 44 to collapse or deflate responsive to the upward pull of compression return springs 42. This will concurrently effect an upward movement of the plate member 26 away from the upper end surface of the cart 22 with which it has been in contact, thereby releasing the cart from restraint and allowing the latter to be moved within the truck body 10 for the mentioned purposes of loading, unloading and so forth.

In lieu of the inflatable air bag members 44 it is also possible to contemplate the utilization of either hydraulically-operated or pneumatically-operated cylinder and piston arrangements which are interposed between the plate members 26 and the roofing structure 18 and which may be actuated so as to impart the desired vertical motion to the plate members 26 towards and away from the cargo or carts 22 located therebeneath.

What is claimed is:

1. In a cargo restraint arrangement for an enclosed truck body having a cargo-supporting floor structure and a roof structure, said floor structure being adapted to have bulk cargo conveyed and stored thereon, the improvement comprising: generally horizontally extending vertically displaceable rigid planar means being disposed below said roof structure, said planar means extending along a longitudinal length of said truck body and positioned at predetermined locations above said bulk cargo; means connecting said planar means to said roof structure for vertical movement relative thereto; said connecting means including resiliently yieldable means for normally biasing said planar means upwardly towards said roof structure; expandable means being interposed between said roof structure and the upper surface of said planar means, said expandable means being normally compressed intermediate said roof structure and the upper surface of said planar means responsive to the upward biasing force of said resiliently yieldable means; and actuating means for pressurizing and expanding said expandable means during predetermined time periods for forceably moving said planar means downwardly towards said bulk cargo into resilient pressure engagement therewith so as to restrain the latter from movement within said truck body.

2. An arrangement as claimed in claim 1, said expandable means comprising at least one inflatable air bag member extending along the longitudinal axis of said truck body and being supported on the upper surface of said planar means; said actuating means being a pneumatic pressure system operatively connected to said air bag member for inflating the latter.

3. An arrangement as claimed in claim 2, comprising a plurality of said planar means being positioned along the length of said truck body above said bulk cargo, at least two parallel spaced planar means being adapted to engage parts of the upper end of separate portions of said bulk cargo responsive to inflation of said air bag members.

4. An arrangement as claimed in claim 2, said air bag member being formed of an air-impervious tubular rubber member, and a sheath of cotton-polyester fabrics encompassing said rubber member.

5. An arrangement as claimed in claim 1, each said planar means comprising a rigid board.

6. An arrangement as claimed in claim 5, comprising foamed cushioning means covering the lower surface of said rigid board for form-fittingly engaging the upper end of the bulk cargo upon contact with the latter.

7. An arrangement as claimed in claim 1, said resiliently yieldable means comprising compression springs adapted to pull said planar means towards said roof structure.

8. An arrangement as claimed in claim 1, said bulk cargo being stored in a plurality of carrier carts being upstanding frames encompassing the cargo, said planar means being adapted to engage portions of the upper end surfaces of said carrier carts.

9. An arrangement as claimed in claim 8, said planar means being arranged in parallel rows extending along the length of said truck body and adapted to engage the front and rear edges, respectively, of said carrier carts so as to restrain the latter from movement along said truck body floor structure.

10. An arrangement as claimed in claim 2, comprising pressure accumulator means being mounted below said truck body for supplying pressurized air to said pneumatic pressure system.

11. An arrangement as claimed in claim 1, said expandable means comprising a plurality of pneumatically-actuated pressure cylinders.

12. An arrangement as claimed in claim 1, said expandable means comprising a plurality of hydraulically-actuated pressure cylinders.

13. An arrangement as claimed in claim 1, said actuating means comprising manually operable controls mounted on said truck body.

14. In a method for the transport of goods racked or stacked in tall upright wheeled carriers supported upon a platform forming a cargo-supporting floor of an enclosed truck body having a roof structure, the improvement which comprises resiliently engaging the uppermost portions of said carriers with normally upwardly biased rigid planar contact means suspended from said roof structure for vertical displacement relative thereto, and applying downwardly directed pressure through the interposition of expandable means between said roof structure and said planar contact means sufficient to engage and lockingly urge said carriers into a fixed and stable position against and upon said platform for transport, releasing the pressure engagement of said contact means for allowing movement of the said carriers on said truck platform and reengaging said contact means in the same manner for continued transport of the truck while the carriers are maintained in a fixed position on the truck platform.

* * * * *